March 13, 1962  R. B. ABBOTT ETAL  3,024,571
APPARATUS FOR MOLDING GLASS
Filed July 25, 1957  11 Sheets-Sheet 1

FIG. 1

INVENTORS
RAYMOND B. ABBOTT
RALPH H. OLSON
BY
ATTORNEYS

March 13, 1962 R. B. ABBOTT ETAL 3,024,571
APPARATUS FOR MOLDING GLASS
Filed July 25, 1957 11 Sheets-Sheet 3

March 13, 1962    R. B. ABBOTT ETAL    3,024,571
APPARATUS FOR MOLDING GLASS
Filed July 25, 1957    11 Sheets-Sheet 5

INVENTORS
RAYMOND B. ABBOTT
RALPH H. OLSON
BY
ATTORNEYS

INVENTORS
RAYMOND B. ABBOTT
RALPH H. OLSON
BY
ATTORNEYS

March 13, 1962  R. B. ABBOTT ETAL  3,024,571
APPARATUS FOR MOLDING GLASS
Filed July 25, 1957  11 Sheets-Sheet 9

INVENTORS
Raymond B. Abbott
BY Ralph H. Olson
Leonard D. Soubier
W. A. Schraich
ATTORNEYS March 13, 1962  R. B. ABBOTT ETAL  3,024,571
APPARATUS FOR MOLDING GLASS
Filed July 25, 1957  11 Sheets-Sheet 10

INVENTORS
RAYMOND B. ABBOTT
RALPH H. OLSON
BY
ATTORNEYS

March 13, 1962  R. B. ABBOTT ETAL  3,024,571
APPARATUS FOR MOLDING GLASS Filed July 25, 1957  11 Sheets-Sheet 11

INVENTORS
*Raymond B. Abbott*
BY *Ralph H. Olson*
*Leonard S. Doubie*
*W. A. Schaich*
ATTORNEYS United States Patent Office
3,024,571
Patented Mar. 13, 1962

3,024,571
APPARATUS FOR MOLDING GLASS
Raymond B. Abbott and Ralph H. Olson, Toledo, Ohio, assignors to Owens-Illinois Glass Company, a corporation of Ohio
Filed July 25, 1957, Ser. No. 674,149
7 Claims. (Cl. 49—37)

Our invention relates to the molding of molten glass into hollow shaped articles and in particular relates to the pressing and blowing method of producing glass articles.

The glass industry has recognized the troubles inherent in the operation of two-piece, open and shut molds since the advent of the automatic machine. In such molds the matching seams are difficult to maintain, both in the mold equipment and the machine parts which carry the molds. Further, such matching surfaces form a material heat barrier or block and presents an uneven heat or temperature unbalance which is impossible to overcome.

On the well known "IS" machine, these troubles have compounded themselves in recent years. With the application of the well known "62" process (Rowe—2,289,046) to said machine and the trend to light weight ware and higher speeds, these problems have been further increased.

In order to offset these difficulties this present invention contemplates the provision of a new type of mold, both in the parison and neck molds as well as the provision of a completely new requirement for the cooling system therefor. For example, for double and single gob operation, the outside surface areas of these molds must be cooled evenly about the vertical axis thereof. The cooling must be continuous and uniform over the entire forming cycle. The system must be capable of applying differential cooling, that is, vertically arranged zones of cooling through the length or height of the mold and the system must be capable of or have the capacity to remove at least double the heat removed in ordinary "IS" cooling.

Further, provision of such cooling must be an independently controllable system and the application of the coolant to the molds must be in controllable and regulable patterns and of equalized pressure. Through such cooling the control of both the horizontal and vertical distribution of the glass in the walls of the article may be obtained and maintained. In addition, to obtain such control, sharp temperature gradients are required through the length of the parison and these are obtainable with the cooling system herein disclosed. In any instance the amount of cooling in either the blank or neck mold must be such that the actual working or production rate of one is equal to the other.

In essence this apparatus concerns the press molding of a parison or blank of molten glass, either singly or in pairs, and the use of an inverted seamless blank mold for forming same. Additionally, there is the usual blow molds positioned at a blowing station and an apparatus for transferring the shaped parisons from the blank forming station to the blowing station.

In the usual stationary section machines such as disclosed in the patent to Ingle #1,911,119, the parisons are formed inverted, but their formation is accomplished by the usual blow and blow method rather than by the press and blow method. The present apparatus contemplates forming parisons in the inverted position by a press method and reverting these parisons during the transfer to the blow mold.

Among the objects is the provision of a new and highly effective continuous cooling system for the parison or blank molds. A further object is the provision of a new and highly effective cooling for the neck molds.

Another object is the provision of a new type of seamless parison mold and a novel mounting therefor.

A further object is the provision of apparatus for reducing vibration of moving parts in a high speed operation.

A still further object is the provision of a mechanism whereby vertically arranged zonal cooling may be applied to a parison forming operation.

Another object is to utilize high pressure fluid to maintain the neck molds closed during the forming operation.

Other objects will be in part apparent and in part pointed out hereinafter.

A glassworking machine embodying the present invention is illustrated as being a machine wherein each unit or section embodies a movable annular blank mold, a stationary partible blow mold, and a split neck mold adapted to cooperate alternately with the said blank mold and blow mold to transfer a blank or parison from the blank mold to the blow mold; a gob delivery mechanism "B" for successively supplying charges to each forming section; and a pressure control mechanism "C" for adjustably regulating the application of actuating fluid pressure to the several operating portions of said forming section, in proper sequence and in timed relation to each other and the gob feeding device.

Forming Section

Figure 1:
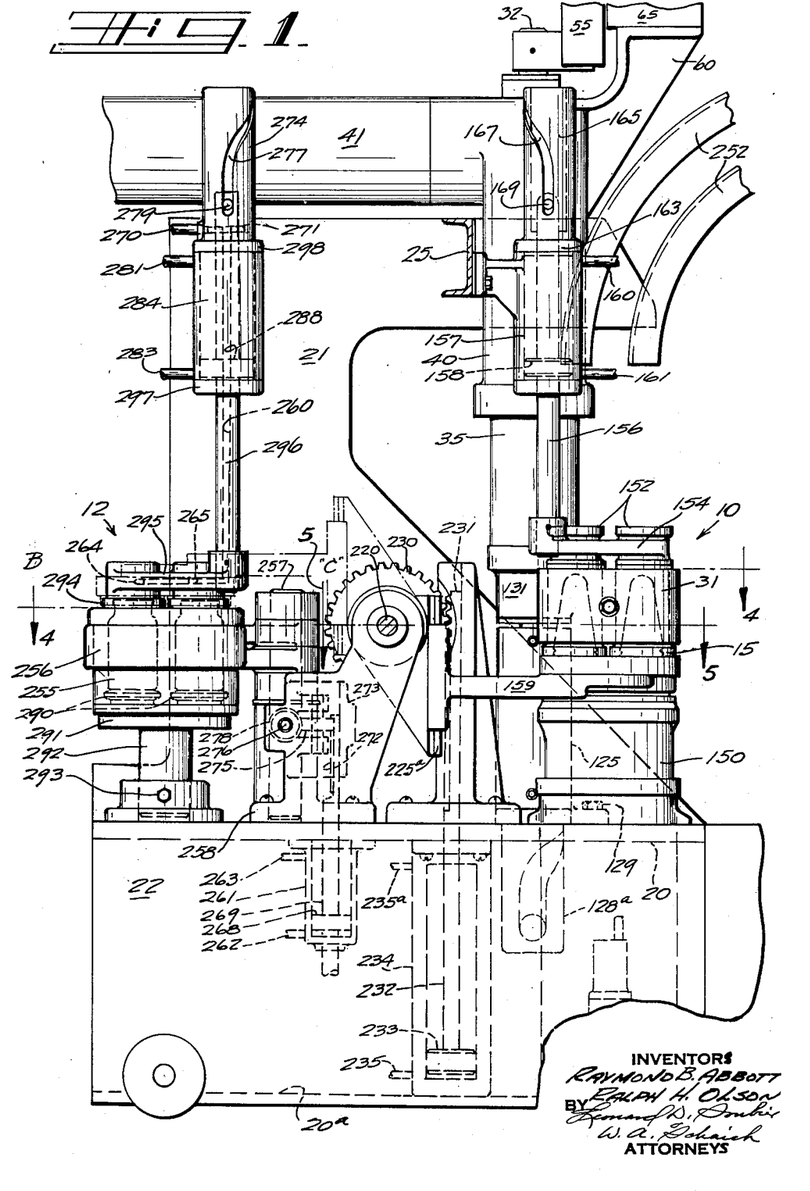
FIG. 1 is an elevational view illustrating the mold arrangement and relationship of this forming machine.
Figure 2:
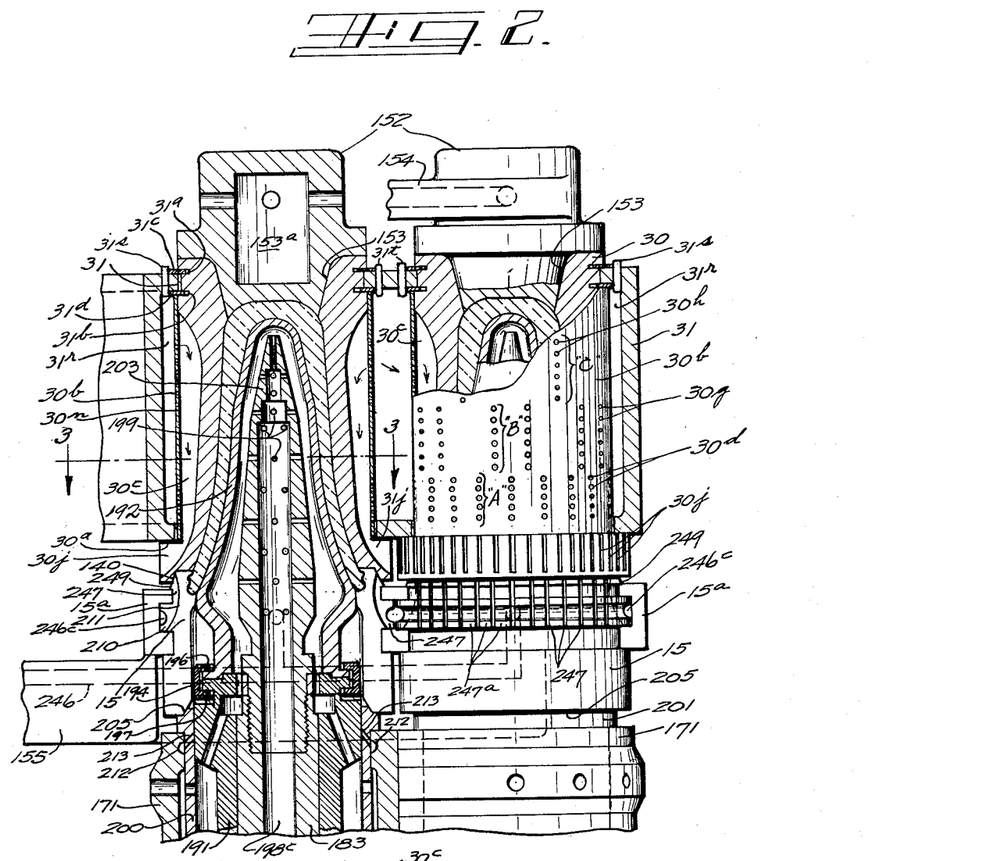
FIG. 2 is a sectional elevation taken at line 2—2 on FIG. 4 through the blank mold head illustrating the plural blank mold structure and cooling devices.
Figure 3:
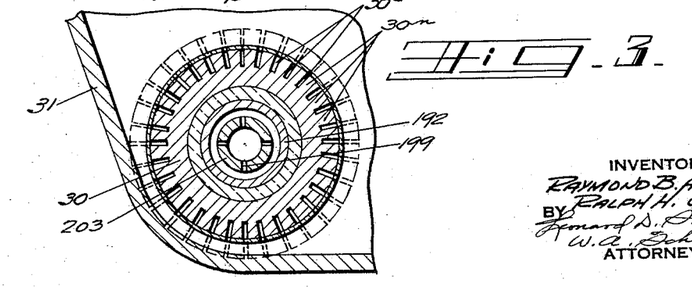
FIG. 3 is a sectional plan view taken at line 3—3 on FIG. 2 which illustrates the mold wall structure with its cooling channels.

This forming section may be provided as one of a series of units arranged either singly, in a straight line beneath the feeder orifice or disposed in some other arrangement about the vertical center line of the feeder orifice or in any desired geometric pattern. In addition these glass forming units may also be arranged upon a table for rotary movement beneath the gob feeder. With particular reference to FIGS. 1 and 2, the forming section embodies an annular blank mold unit 10 which remains permanently in inverted position, but which is movable into and out of a parison forming position.

In this present disclosure the drawings illustrate a plural mold cavity structure, but of course the invention is applicable to a single mold structure.

Figures 6, 7, 8:
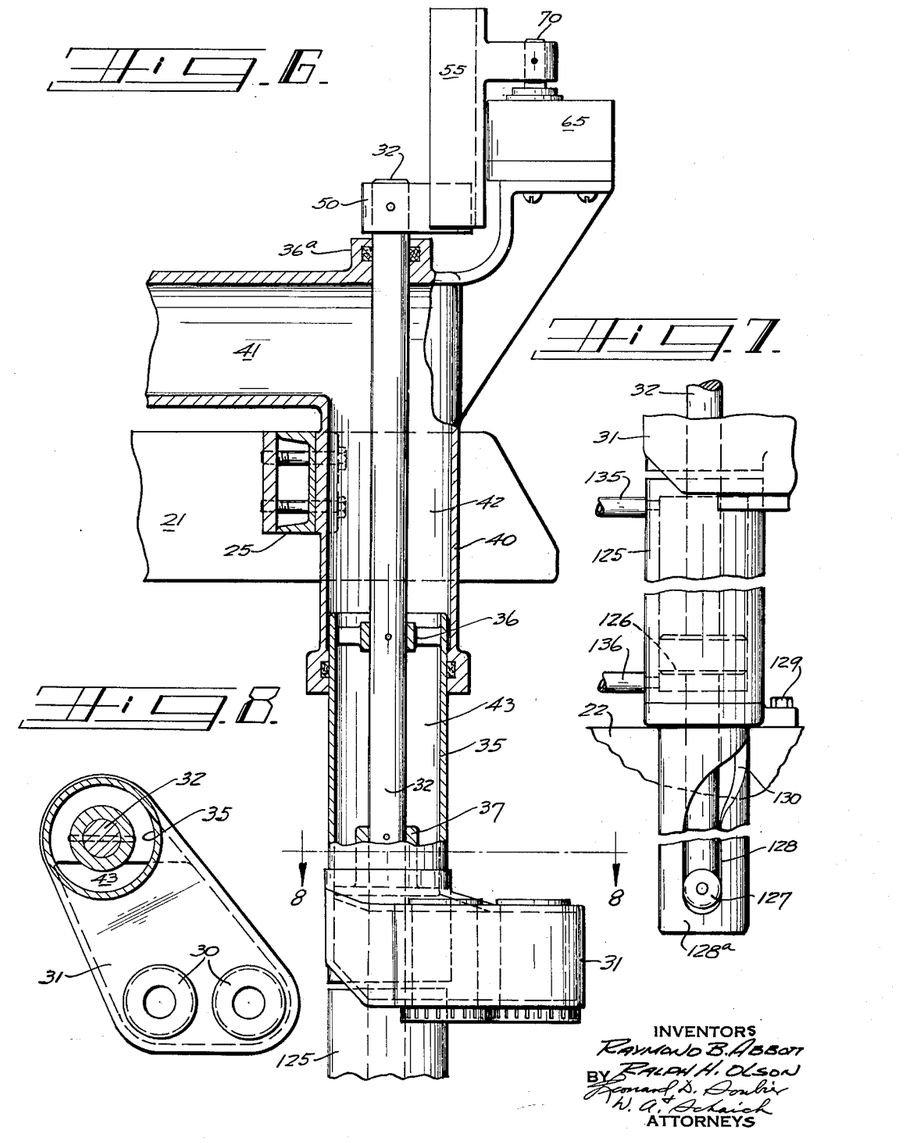
FIG. 6 is a part sectional elevation of the blank mold raising and swinging devices illustrating both the control of the swing of the blank mold and its holder and the cooling air channels therefor.
FIG. 7 is an elevational view of the lower end of the blank mold raising, lowering, and swinging mechanism.
FIG. 8 is a part sectional plan view of the blank mold and its holder.
Figure 9:
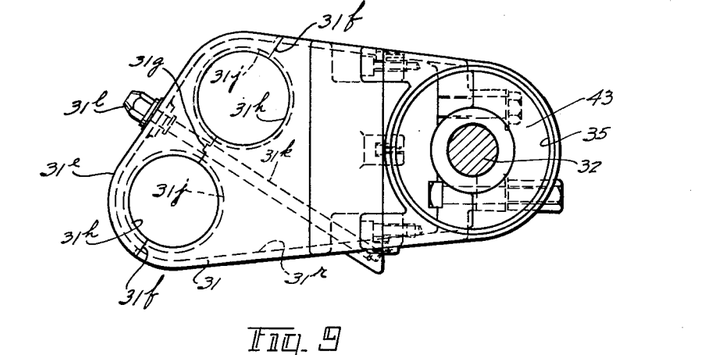
FIG. 9 is a plan view of the blank mold holder illustrating its assembly structure.
Figures 10, 11:
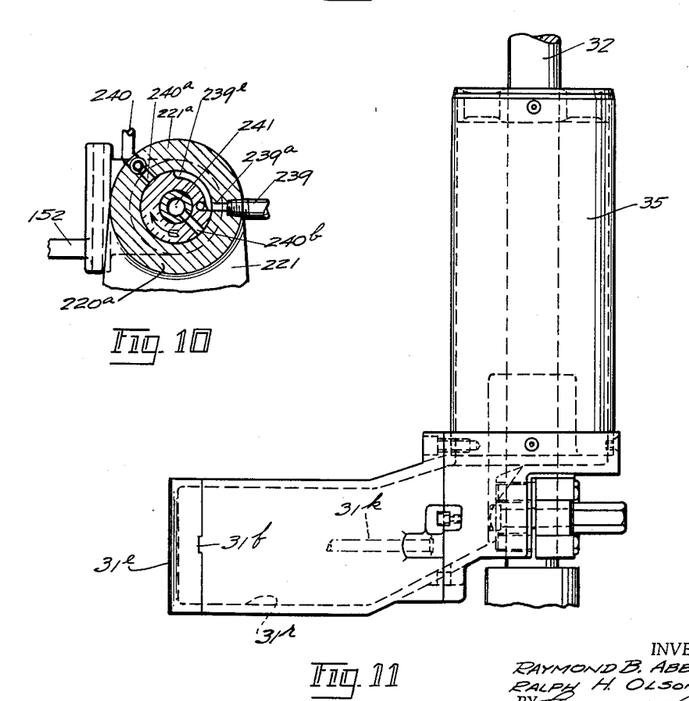
FIG. 10 is a section taken at line 10—10 on FIG. 5 and illustrates the conduits for providing auxiliary pressure for closing the neck molds.
FIG. 11 is an elevational view of the blank mold holder structure.

A blow mold unit 12 of the split mold type is permanently disposed in neck-up position at the final blowing station, and a split neck ring 15 is adapted to swing about a horizontal axis from the blank or parison forming station (FIG. 1) to transfer and invert a parison into upright blowing position at the blow mold station for final blowing into a completed article. The mold units 10 and 12 and the neck ring holder 15a are supported upon a platform 20 which in turn is connected to and supported by upright frame structures 21 mounted upon a base 22. These frames 21 are interconnected at their upper ends by a channel member 25 (FIGS. 1 and 6). Each parison mold unit is comprised of a pair of annular unsplit shaping molds 30 mounted in a hollow holder 31 which is in turn mounted upon and attached to a vertical shaft 32. The hollow holder 31 is formed at one end in a hollow sleeve portion 35 having inner support bearings 36 and 37 attached to shaft 32. The sleeve portion 35 is adapted for telescopic movement in a hollow member 40 and thus provides a continuous conduit for cooling air from a source of supply (not shown) through channels 41, 42, and 43, to and around the molds 30 (FIGS. 1 and 6) for the cooling or temperature control thereof. This blank mold supporting member is of a specific structure which will be described in detail later on in this description.

The blank molds 30 and their support 31 are adapted for both vertical and horizontal motion, with the shaft 32, to bring them to the operative forming position and then to an inoperative position above and to one side of the operative position. The upper end of shaft 32 has mounted thereon and attached thereto a bracket 50 which carries in its outer end a pivot block 52 pivoted at 53 on said bracket 50. The pivot block 52 is adapted for vertical sliding movement in slide block 55.

A support bracket 60, formed as an extension of the vertical hollow member 40, provides a supporting base 61 upon which is mounted a cushion control block 65. The slide block 55 is mounted on and attached to a vertical pivot shaft 70 which in turn is mounted in the control block 65. This mounting permits the slide block 55 to pivot with shaft 70 for the following purpose (FIGS. 16–21).

Figure 20:
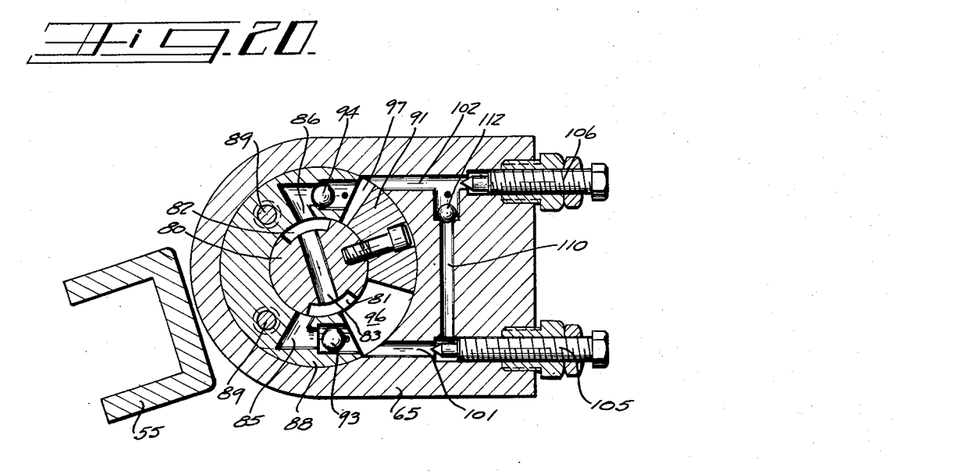
FIG. 20 is a sectional view taken at line 20—20 on FIG. 19.
Figure 21:
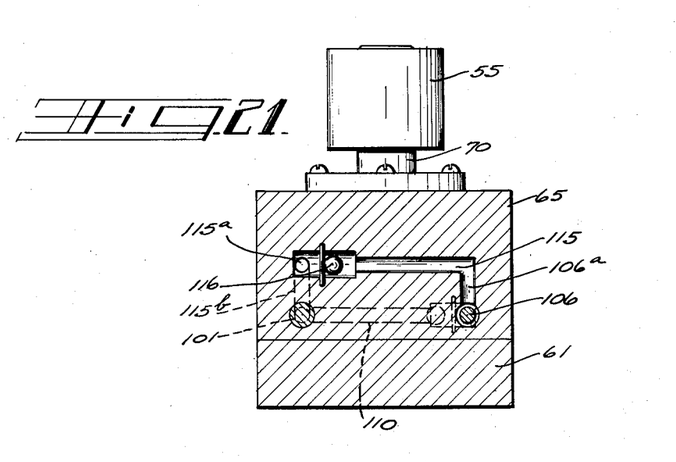
FIG. 21 is a section taken at line 21—21 on FIG. 18.

The blank molds 30 are required to lift and swing about shaft 32 with great rapidity and in order to avoid the detrimental effects of the successive rapid starting and stopping of the swing of the molds an oil cushion control 65 has been provided which operates as a tongue dampening means. The shaft 70 has formed thereon a shoulder 80 having formed in the opposite sides thereof extended ports 81 and 82. These ports are of equal dimension and are interconnected by a channel 83. Each port 81 and 82 is arranged to alternately register with channel 85 and 86 respectively formed in a stationary plate 88 locked to the control box 65 by screws 89 as shown in FIG. 20. A baffle blade 91 is attached to the rotary shoulder 80 of shaft 70 and oscillates with said shaft 70.

Check valves 93 and 94 are formed to cooperate with ports 85 and 86 respectively to control the flow of oil to and from chambers 96 and 97, formed between the blade 91 and plate 88, such flow from ports 85 and 86 being due to movement of blade 91. Channels 101 and 102 lead from chambers 96 and 97 respectively to bleeder needle valves 105 and 106 respectively.

An additional oil channel 110 interconnects channels 101 and 102 and has a check valve 112 therein which causes the exhaust oil from chamber 97 to pass through needle valve 106 to thus provide an oil cushion against which the blade 91 will work to cushion the swing of the mold holder 31 when the molds 30 are removed from their forming position. After passing needle valve 106, the oil then passes through conduit 106a into channel 115, check valve 116, channels 115a, 115b and 101 and then into chamber 96.

The channel 110 also interconnects channels 101 and 102 and is adapted to control, through the restriction provided by check valve 116, the exhaust of oil from behind blade 91 in chamber 96 to cushion the swing of the molds 30 when they are moving to their operative position. Thus the oil will flow from chamber 96 through channels 101, needle valve 105, channels 110 and 102, into chamber 97. This structure permits oil to be freely sucked into the chambers 96 and 97 on one stroke and to be controlled in its rate of exhaustion as it is freed from said chambers on the opposite stroke. Oil is provided to this control block 65 through channel 117 and locked therein by plug 118.

Through the above mechanisms the mold support 31 with its molds 30 may be successively swung to and from its operative position to the inoperative position at very high speeds without detrimental vibration. The swinging, raising and lowering of the blank mold support 31 and the blank mold 30 is accomplished through a cylinder 125, a piston 126 attached to the piston shaft 32, a cam roll 127 formed on the lower end of shaft 32 and a control cam 128 formed in the cylinder head 128a attached to the lower end of cylinder 125. The cylinder 125 is mounted and retained on the base 22 by the bolts 129 (FIGS. 1 and 6). Suitable actuating pressure is supplied to cylinder 125 through pipes 135 and 136 to raise, lower and swing support 31 with its molds 30.

The upper end of piston shaft 32 extends upwardly through the telescopic member 35 and bearing 36a of conduit 40 and is then attached to the swing cushion control 65 through lever 50. This particular control mechanism has been previously described above.

The lower end of piston shaft 32 extends through and is slidably mounted in the cylinder head 128a formed as a part of cylinder 125.

As the piston 32 moves from the position shown in FIG. 6, under the influence of pressure supplied through pipe 136, to raise and swing the blank molds 30, the cam 128 acting on cam roll 127 permits the mold support 31 and molds 30 to first move straight up until the curved section 130 causes the shaft 32 to rotate and swing the mold support 31 laterally out of the path of the oscillating neck rings 15, the construction and operation of which will be hereinafter described. As the shaft 32 rotates, its connection with the cushion control 65 is actuated to cushion the end of the rotation and prevent vibration of these mold parts. When the piston stroke is reversed the molds 30 and support 31 swing into operative position over and in register with the neck molds 15.

During the charging of the blank molds 30 at the parison forming station, the neck molds 15 occupy a position beneath and in registered contact with the blank molds 30. This registration is obtained and maintained by the mating angular surface areas 140 (FIG. 2) so that each blank mold 30 accommodates itself to the position of its respective neck ring 15. The neck molds 15 are of the split type and the halves thereof are carried upon support arms 155 and 159. These neck molds 15 are so mounted upon their respective supports as to have little if any, horizontal or sliding motion thereon.

The blank molds 30 are movable in any direction with respect to their support 31. Reference to FIG. 2 will show that the blank molds 30 can move horizontally with respect to support 31 due to the clearance provided at 31a and 31b. Guide plates 31c and 31d attached to the top end of support 31 retain the molds 30 in the support but permit limited relative movement therebetween in both the vertical and horizontal planes as will be more fully disclosed hereinafter.

*Parison Forming*

Formation of parisons in this present mechanism is accomplished by the well known press method. The charges of glass being provided by the usual glass feeding device and directed to the parison molds 30 through gob chutes 252 and 252a adapted to guide the charges to and through the open upper ends of the blank molds 30. Concurrent therewith, but following the charging of the molds, baffle plates 152, mounted on an arm 154, are swung about shaft 156, through activation provided by cylinder 157 and cam 167 and brought into registration with and seated upon the molds 30.

Figure 4:
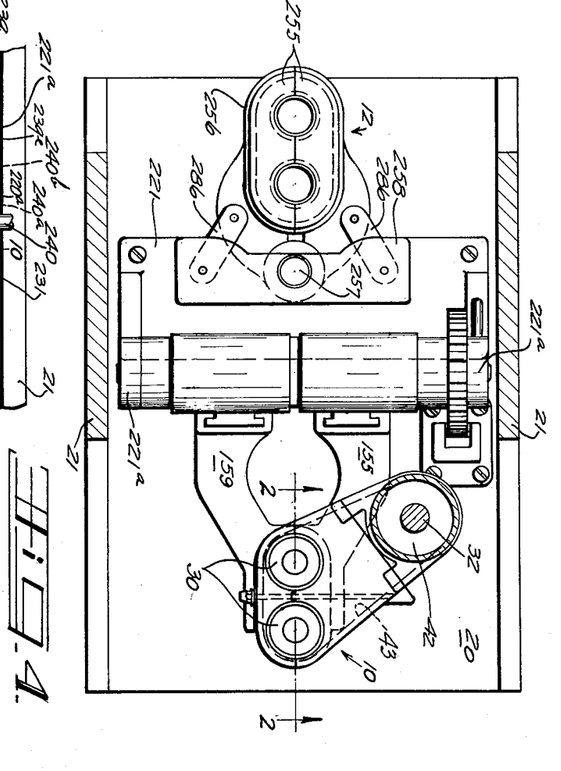
FIG. 4 is a plan view of the blank, neck and blow molds taken approximately at line 4—4 on FIG. 2.
Figures 12, 13:
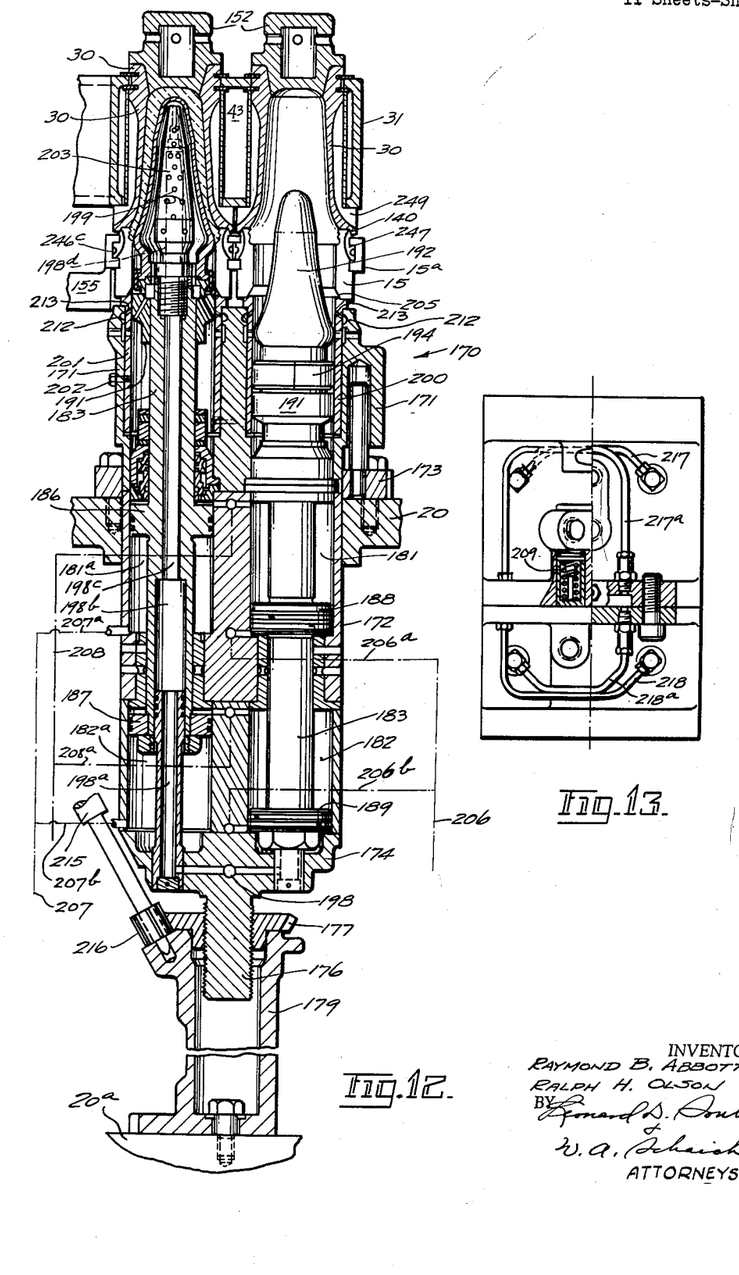
FIG. 12 is a sectional elevational view through the parison forming plunger mechanism.
FIG. 13 is a view of the oiling system attached to the outside of the parison plunger cylinders.

The pressing of the gobs of molten glass to form blanks or parisons is obtained through the following mechanism: A vertical, fluid pressure twin cylinder unit 150 (FIG. 1) is mounted upon the base 22, below and in alignment with the blank and neck molds 30 and 15 respectively, at the charging position of the machine. When the blank molds 30 are in forming position, as shown in FIGS. 1, 4 and 12, the open upper end thereof is adapted to be closed by a cover or baffle plate 152 which is shaped to fit within complementary depressions 153, formed in the upper end of the blank molds 30. The baffle plates 152 are provided with internal cavities 153a into and through which cooling fluid may be passed.

The arm 154 which supports the baffles 152, is secured to the lower end of a vertically reciprocable piston rod 156, which extends upwardly through a fluid pressure cylinder 157 and is provided with a piston 158 (FIG. 1). The cylinder 157 is suitably mounted on the cross channel 25 and is supplied with valve controlled fluid under pressure through pipes 160 and 161, in order to raise and lower the baffles or cover plates 152 with respect to the blank molds 30.

The upper portion of the piston rod 156 extends through and is slidably mounted in an upper cylinder head 163, formed with an upwardly extending cam sleeve 165. This sleeve functions as a protective housing for the top portion of the piston rod 156, and is provided with a helical slot 167 into which projects a cam pin 169 carried by the piston rod 156. As the piston moves upwardly, under the pressure admitted through pipe 161, to elevate the mold baffles 152, the cam slot 167, acting on the pin 169, imparts a partial rotation to the rod 156 which is sufficient to swing the baffles 152 in a lateral direction and out of the path of the oscillating neck rings 15. Upon the downward stroke of piston 158, the baffles 152 will return to closing position in cooperation with the blank molds 30.

During the mold charging and blank forming operations, the neck rings 15 occupy a position beneath and in alignment with the blank molds 30 (FIGS. 1, 2 and 4) and are provided on their upper ends with an angular surface area 140 which is adapted to cooperate with complementary recesses in the lower ends of the blank molds 30, thereby maintaining an exact registration between the neck rings 15 and blank molds 30 during the blank forming operations.

The pressing operation is supplied by the following mechanism: a cylinder unit 170 comprised of a pair of vertical tandem cylinders having interconnected upper and lower cylinder sections 171 and 172 of the twin cylinder unit 170, are mounted upon an adjustable base 174. Base 174 is formed with a threaded portion 176 mounted in and extending through an adjusting pinion 177 supported in a bracket 179. This twin cylinder unit 170 is supported in a bearing member 173 mounted on the platforms 20 and 20a forming part of the base 20.

The cylinder section 172 has formed therein, pairs of vertically disposed tandem cylinders, one pair being cylinders 181 and 182, and the other pair being cylinders 181a and 182a. A piston rod 183 extends through each vertically aligned tandem pair of cylinders 181, 182, and 181a, 182a. Each piston rod 183 is provided with pairs of pistons 188, 189 and 186, 187 respectively. Disposed at the top of and fastened to each piston rod 183 is a head 191 which supports a plunger 192 in aligned freely floating relation thereto. A split ring 194 is so formed internally as to override the shoulders 196 and 197 of each plunger 192 and head 191 (FIG. 2), thus locking them together in such manner as to prohibit relative vertical movement between said plunger and head with respect to each other, but permitting relative horizontal movement with respect to each other.

Ported sleeve members 200 and 201 are inserted in the upper ends of cylinders 181 and 181a and fastened as at 202. These sleeves are tapered at their outer upper ends, as at 205 (FIG. 2), to align and locate the neck mold rings 15 with respect to the cylinder sleeves 200 and 201, in order that when the blank molds 30 are swung into the charging position and lowered upon the neck rings 15, they may, due to their floating action, be thus automatically aligned with respect to the neck mold and retained in this aligned position.

When the plungers 192 are moved upwardly into glass pressing position (FIG. 2), an external straight portion 210 on each said plunger will move into contact with a similar straight portion 211 formed on the inner surface of the neck rings 15. As above described, the plungers 192 may move freely in the horizontal plane and due to this fact they will be thus automatically brought into perfect alignment with the neck rings 15.

Air for cooling the external surface areas of the plungers when they are in their down position, may be provided through the openings 212 and ports 213 formed respectively in the walls 171, and the sleeves 200 and 201. Cooling air for the internal areas of plungers 192 is provided through conduits 198 in the cylinder base 174, conduits 198a, 198b, 198c and 198d. Conduit 198d leads to a series of openings 199 formed in the nozzle 203. Said openings 199 are formed in a predetermined pattern adapted to the particular shape of plunger and to give a desirable cooling pattern to the plunger (FIGS. 2 and 12).

The proper vertical or operating position of the neck ring guides 205 and the press plungers 192 with respect to the blank and blow molds, may be obtained by means of a crank 215, pinion 216, and a ring gear 177. By rotating the crank 215, the gear 177 will be rotated and through the threaded connection it has with member 176 both the neck ring guides and plungers may be moved upwardly or downwardly as a unit as the particular situation may demand.

The reciprocation of the plungers 192 to and from pressing position is obtained through valve controlled fluid pressure thereto as will be later described. The plungers are raised into pressing position by high pressure air admitted beneath the pistons 186, 187, 188, and 189 through separately controlled lines 206 and 207 respectively. The plungers 192 are lowered by pressure admitted above the pistons 186, 187, 188, and 189 by a single valve control to line 208. A valve block 350 is provided which controls the application of high pressure air to the pressing plungers and its operation will be described hereinafter under the description of the fluid pressure control system. A check valve 209 is provided in the line 206 which checks the exhaust of pressure beneath pistons 186, 187, 188, and 189, and acts to prevent impact shock at the end of the down stroke of these pistons (FIG. 13).

An oil chamber 214 is provided from which oil lines 217 and 217a lead to the upper cylinders 181 and 181a respectively. Oil lines 218 and 218ᵃ lead respectively to the lower cylinders 182 and 182ᵃ (FIG. 13).

Neck Mold Mechanism

The neck mold inverting mechanism is best shown in FIGS. 4, 5, 14 and 15. This mechanism is comprised of a pair of support arms 155 and 159 fulcrumed on a shaft 220 mounted in bearings 221ᵃ formed on bearing bracket 221. The bearings 221ᵃ support the shaft 220 in a horizontal position. The shaft 220 is provided with an enlarged portion 223, upon which is mounted a pair of sleeves 224 and 224ᵃ, each sleeve adapted for both rotary motion with and sliding movement along the length of shaft 220. Each sleeve is provided with a slideway 225 and 225ᵃ formed thereon in such a manner that when the neck molds are in either of their two operative positions, these slideways will be disposed in a vertical plane. The arms 155 and 159 are also provided with slide formations 152ᵃ and 153ᵃ adapted to cooperate with the slideway portions 225 and 225ᵃ of the sleeves 224 and 224ᵃ. This slide and slideway structure will permit the neck rings 15 to be adjusted vertically at either of the operative positions to bring the neck rings 15 into proper cooperative vertical position with respect to either the tapered formation 205 on the upper end of the plunger cylinder sleeve 200 or into proper vertical position with respect to the top surface of the blow molds 12. The rotation of the neck mold arms 155 and 159 about the axis of shaft 220 to transfer the parisons from their forming station to the blowing station is accomplished through a pinion 230 and a vertically disposed pinion rack 231 positioned in meshing contact with the pinion 230. The rack 231 is formed on the upper end portion of a piston rod 232, attached to a piston 233 and adapted for vertical movement in a cylinder 234. Air inlet pipes 235 and 235ᵃ are adapted to permit pressure air, under valve control, to enter the cylinder 234 at the bottom and top ends thereof respectively.

It is necessary that the neck rings be held tightly closed at the parison forming station and that they be opened to release the parison at the blowing station. Normally the neck rings are held closed under spring pressure provided by springs 237 and 237ᵃ disposed between the ends of bearing brackets 221ᵃ and the outer ends of the sleeves 224 and 224ᵃ. These springs normally hold the faces of the halves of the neck rings 15 in tight contact and with sufficient pressure to support a formed parison. However, when the molding members are in the position shown in FIG. 2, which is the position for shaping the parison under molding pressure, then further pressure must be applied to these neck rings 15 to insure that they remain tightly closed. To accomplish this, air under pressure is continuously supplied through the conduit 239 to apply a pressure over and beyond that supplied by the above mentioned springs 237 and 237ᵃ. This pressure is applied to the outer ends of the sleeve members 224 and 224ᵃ to cause them to function in the manner of pistons, and is supplied thereto through the following mechanisms.

Figure 5:
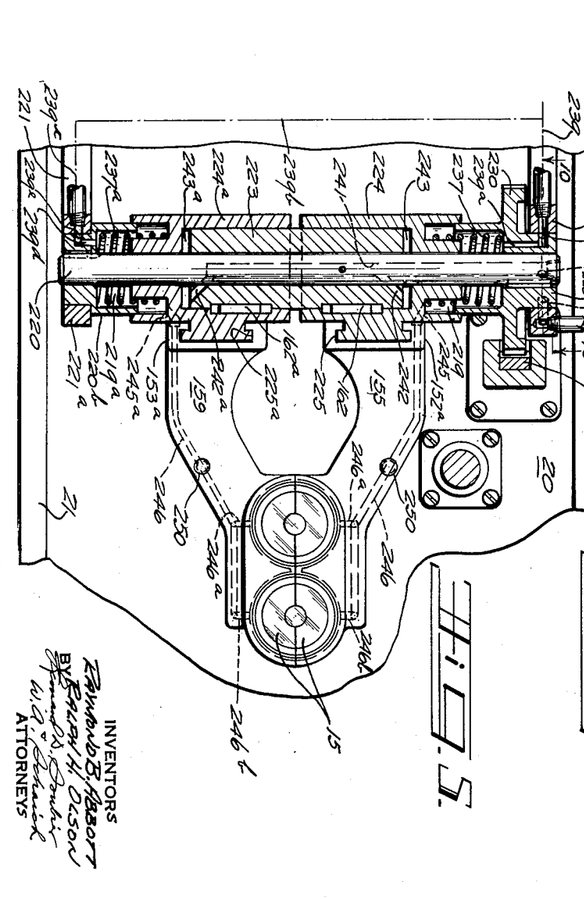
FIG. 5 is a sectional view taken on line 5—5 on FIG. 1 and illustrates the neck mold fluid pressure closing mechanism.
Figure 16:
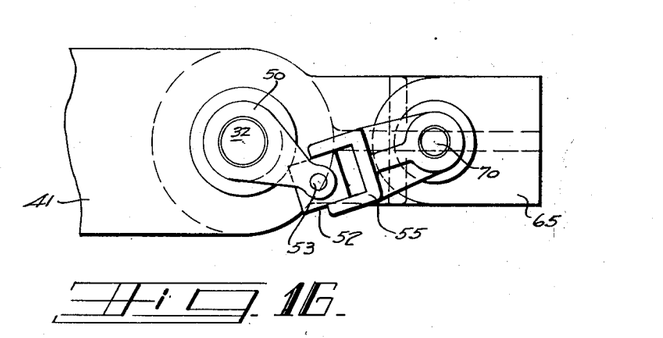
FIG. 16 is a plan view of the snubber structure for the parison mold.
Figure 17:
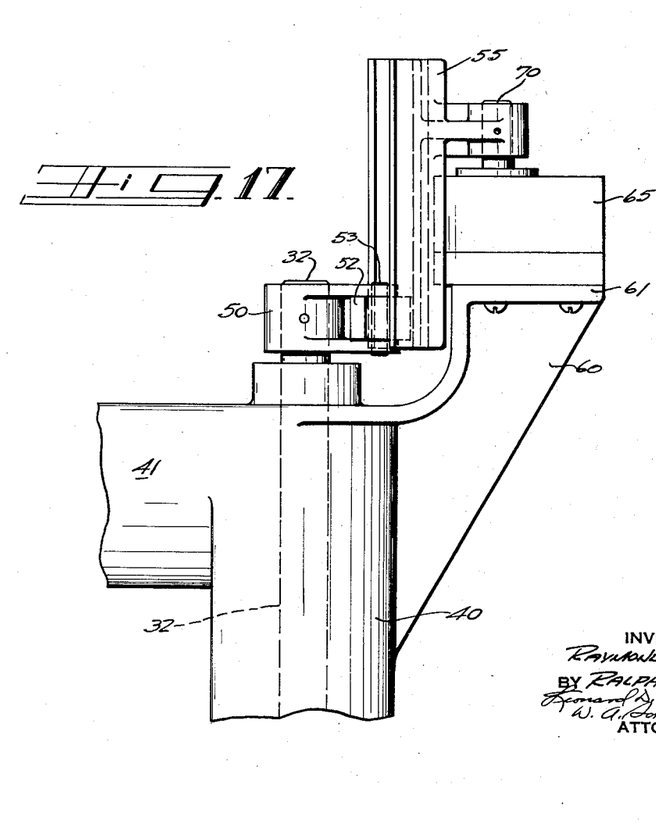
FIG. 17 is an elevational view of the snubber structure.
Figure 18:
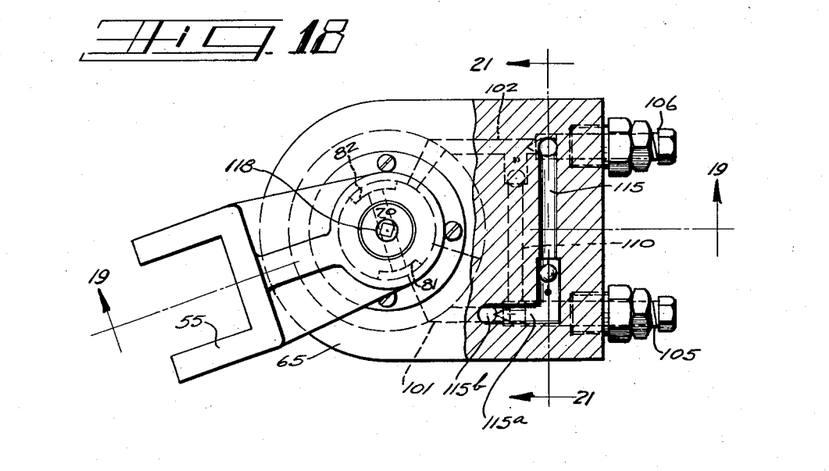
FIG. 18 is an enlarged, part sectional view of the snubber of FIG. 16.
Figure 19:
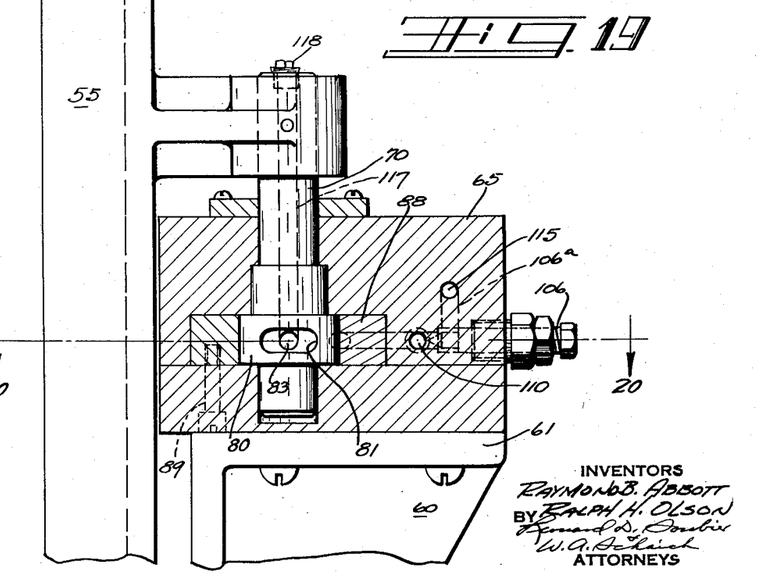
FIG. 19 is a partial section taken at line 19—19 of FIG. 18.

Continuous pressure air is supplied from conduit 239 to channels 239ᵃ, 239ᵇ, 239ᶜ, and 239ᵈ into chambers 219 and 219ᵃ when the neck mold arms 155 and 159 are in the position shown in FIGS. 4 and 5 to insure holding the neck rings 15 closed against the glass pressing pressure. After the pressing operation is completed and the transfer of the parison is in progress, this air pressure may be and generally is continued through at least a portion of the transfer movement for cooling purposes which will be later described. This continued air application is accomplished through the extension of channel 239ᵉ which permits flow of pressure through approximately 90° of transfer rotation (FIG. 16). When opening 239ᵃ reaches the end of channel 239ᵉ, the high closing pressure is released and the closing of the neck rings is returned to the control of the springs 237 and 237ᵃ. Through this arrangement the high pressure closing of neck molds 15 is obtained automatically through rotation of the arms 155 and 159 about shaft 220. This same air control structure is provided at both ends of shaft 220 in order that like pressure may be supplied to both of the chambers 219 and 219ᵃ. This closing pressure is then transmitted through arms 155 and 159 to the halves of the neck rings 15 and holds them tightly closed during the interval the plunger 192 is pressing the glass in the molds 30 as illustrated in FIG. 2.

When the neck molds 15 carrying the parisons, are rotated and reach the blowing station, it then becomes necessary to open these neck rings 15 and release the parisons to the control of the blow molds 12. In order to accomplish this, valve controlled pressure air is supplied to a conduit 240 and channel 240ᵃ formed in the stationary portion of bearing 221ᵃ. When shaft 220 and bearing members 220ᵃ and 220ᵇ are rotated, it brings a channel 240ᵇ into register with channel 240ᵃ. This registration admits air into a channel 241 formed through the center of the shaft 220 which leads to a pair of ports 242 and 242ᵃ, opening into chambers 243 and 243ᵃ. Thus when the pressure is discontinued in the chambers 219 and 219ᵃ, and air pressure is supplied through ports 242 and 242ᵃ, the sleeves 224 and 224ᵃ are caused to move away from each other, thus opening the neck rings 15 by sliding them in the horizontal plane along the splines 162 and 162ᵃ of part 223 (FIG. 5). This opening of the neck rings releases the parison to the confines of the blow mold 12 which has been closed just prior to the release of the parison. The piston 233 of the transfer cylinder 234 is then subjected to air under pressure admitted through pipe 235ᵃ to return the neck rings 15 to the parison forming position. During this returning motion, the pressure in chamber 243 and 243ᵃ will be released, the springs 237 and 237ᵃ will then cause the neck rings to close. Air under pressure will be again applied in chambers 219 and 219ᵃ and as the port 239ᵃ connects again with the channel 239ᵉ, pressure will be again applied to the neck rings 15 as the neck rings return to the forming position.

Mold Cooling

Figure 15:
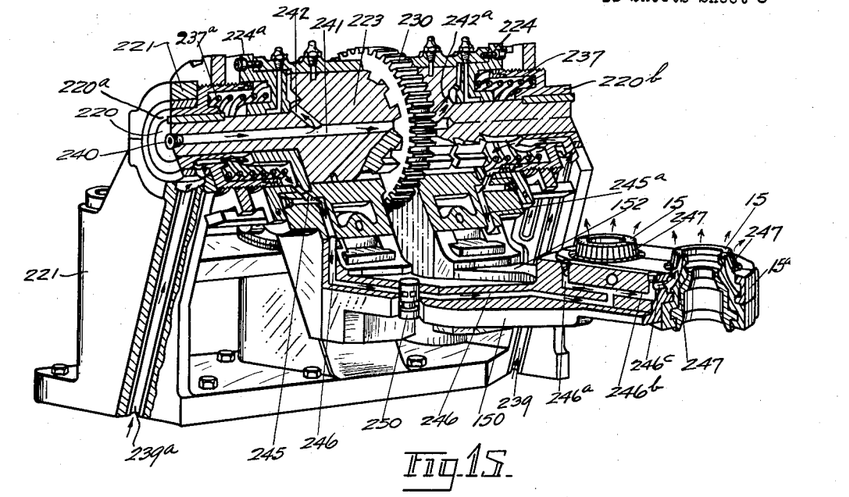
FIG. 15 is a part sectional perspective view of the parison transfer mechanism showing the cooling air conduits.

In order that high speed production may be obtained and maintained it is, of course, necessary that the several molds be cooled during the forming operation and in particular the neck rings 15 should be cooled during the molding operation because with this particular mechanism, the glass forming molds are being utilized at exceptionally high speeds. For example, at speeds approximately four times faster than is normally accomplished with similar mechanisms. In order to accomplish this necessary cooling, the air which is supplied under high pressure through pipes 239 and 239ᵃ, to apply additional pressure on the neck molds in their closed positions, is also utilized to provide a high velocity cooling medium for the neck rings 15 (FIGS. 4, 5 and 15). This is accomplished by providing relatively small high velocity ports 245 and 245ᵃ, leading from the chambers 219 and 219ᵃ respectively, surrounding the springs 237, and connecting into conduits 246, 246ᵃ, and 246ᵇ formed in the support members 155 and 159 and leading into the circular channels 246ᶜ surrounding the outer wall surface area of the neck rings 15 (FIG. 2). A series of equally spaced vertical slots 247 are formed in the outer peripheral surface areas of the neck rings 15 and each of these slots bisect the circular channel 246ᶜ formed in and surrounding the neck rings 15. The neck ring holders 15ᵃ surrounding the neck rings 15, cooperate with this circular channel 246ᶜ to enclose and form same and to cause the high pressure and high velocity cooling air flowing through this channel to flow upwardly through slots 247. These slots 247 and the ribs 247ᵃ formed therebetween are spaced around the outer surface areas of the neck rings open outwardly at the openings 249 located (FIG. 2) between the bottom end of the blank sections 255 of the blow mold when in a closed position.

Figure 14:
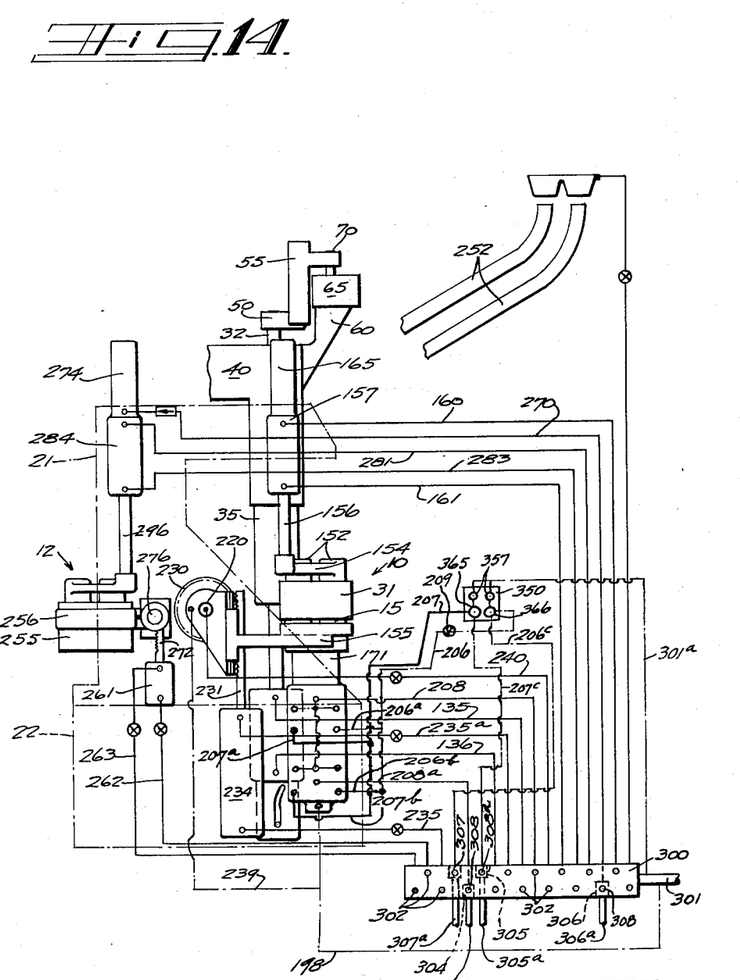
FIG. 14 is a fluid piping diagram for the apparatus.

With reference to FIGS. 14 and 1 in which the blow mold halves 255 are shown as occupying a closed position with the rack bar 272 and piston 268 at the limit of their downward strokes, it will be apparent that at the completion of the finish blowing operation, the application of pressure beneath the piston 268 will elevate the rack bar 272. As the rack bar 272 is raised, the gear 275 will be rotated, causing the rotation of the spiral gears 278 and the partial rotation of the meshing spiral gears (not shown) to rotate mold holders 256. This partial rotation will open the blow mold through the medium of the connecting links 286.

The lower portion of the blow mold is closed by bottom plates 290 which are supported by a holder 291. This holder is adjustably mounted on a support 292 carried by the base 22 of the machine. The bottom plate 290 may be adjusted vertically with respect to the blow mold by loosening the clamp 293.

The upper portion of the blow mold is adapted to be closed by blow heads 294, which are detachably secured to a hollow arm 295 by any suitable connection, such as a bayonet joint connection. Each blow head is provided with an opening 296$^a$ which registers with a nozzle formed on the arm 295. As shown in FIG. 1, the arm 295 is secured to the lower end of a piston rod 296 which extends upwardly through heads 297 and 298 of a fluid pressure cylinder 284 and is provided with a piston 288. This cylinder is carried by one of the side frame elements 21 and is supplied with fluid under pressure at points above and below the piston through pipes 281 and 283 respectively.

Blowing pressure is controlled by and delivered from a valve bank 300 to the parisons when in the blow mold 12, through a pipe 270 which communicates with a circular recess 271 provided in the upper cylinder head 298. When the blow head is in operative position, the recess 271 communicates with a passageway 260 which extends axially through the piston rod 296 and communicates at its lower end with conduits 264 and 265 formed in the interior of the hollow arm 295. The upper portion of the piston rod 296 extends into a housing 274 which is formed on the upper cylinder head 298 and is provided with a spiral slot 277 for engagement by a pin or roller 279 carried by the piston rod 296. As the piston 288 rises to elevate the blow head at the completion of a blowing operation, the slot 277, acting on the pin 279, imparts a partial rotation to the rod 296 that is sufficient to swing the blow head 295 in a lateral direction out of the path of the neck ring 15 as it swings the parison between the blank forming and finish blowing stations.

In FIG. 1, the blow head 295 is shown as contacting the top of the blow mold 12 during the finish blowing operation, the neck ring 15 having been returned to the blank forming station. By this arrangement, the blowing operation may overlap the succeeding blank forming operation, thus permitting the ware to remain in the blow mold for relatively longer interval of time.

Fluid Press Control

The fluid pressure control mechanism "C" as shown in FIG. 14, is approximately the same as that shown in the Ingle patent #1,911,119 previously mentioned and therefore only a general description thereof will be set forth herein.

This mechanism comprises a valve chest 300, which is supplied with air under pressure from a source of supply (not shown) by pipe 301, and with which all of the pipes communicate that supply valve controlled fluid pressure to the operating cylinders previously described, with the exception of the pipes 198 and 239, and 301$^a$. Pipes 198, 239 and 301$^a$ connect directly with the supply pipe 301. Communication between the valve chest 300 and the operating mechanism pipes is controlled by valves 302 and 308. The valve chest 300 is provided with chambers 304, 305, 306, and 307 (shown in dotted lines on FIG. 14) which are respectively supplied with desirable operating pressure for the finish blowing pressure and plunger valve block 350 by pipes 304$^a$, 305$^a$, 306$^a$, and 307$^a$, and with which the pipes 208$^a$, 207$^c$, 270 and 206$^c$ communicate respectively. Communication between these last-mentioned pipes and their respective chambers is controlled by valves 308.

The several valves above-mentioned of the control mechanisms of the shaping machine, are opened at the desired time intervals by pairs of studs, which are mounted in the same vertical plane and in a series of such planes along the outer surface of a constantly rotating horizontally disposed drum, through the medium of levers (not shown) which are pivotally mounted on the valve chest 300. The valves are maintained open by latch elements (not shown), until these elements are tripped by studs, also provided on the surface of the drum. The duration of the time intervals between the opening and closing of the several valves are determined by the distances between the pairs of studs, it being understood that the studs are secured to the drum in the same vertical plane and adapted for adjustment towards or away from each other. Thus, by increasing or decreasing the distance between the studs for each valve, or by shifting the position of one set of studs relative to another set in the same plane, the duration of the several operating pressures may be controlled as desired, and also the time of occurrence of any operation may be regulated relative to the time of occurrence of the other operations.

The drum is mounted upon a common shaft, which is driven in timed relation with the feeding mechanism through the medium of a sprocket wheel. The drum may be individually disconnected from the shaft by a clutch member, thus rendering it possible to discontinue the operation of the shaping machine.

An air valve block 350 (FIG. 14) is mounted on the gob guide support 252$^b$ and is provided with high pressure air (75–100 p.s.i.) from a main line 301$^a$. This block 350 provides two pressure control valves 355, each adapted to individually control the pressure of the air supplied to the bottoms of the plunger cylinders 181, 182 and 181$^a$, 182$^a$, through lines 206, 206$^a$, 206$^b$, and 207, 207$^a$, and 207$^b$ respectively. The pressure control valves 355 are held in normally closed position by a spring 356.

In order that the pressure of the air from the main line 301$^a$ may be regulated and controlled, a pair of adjusting screws 357 provide means for adjusting each of the valves 355 so that the actual pressure to the bottom of each of the above-mentioned cylinders may be individually regulated. As the pressure air passes the valves 355, if flows through openings 360 and 361 into chambers 362 and 363 where it is normally retained until the valves 365 and 366 are actuated by the tappets 367 and 368. Valves 365 and 366 are held normally closed by springs 369. Adjustment of screws 357 to vary the pressure applied by spring 356 to valves 355, will permit regulation of the pressure of the air supplied to chambers 362 and 363 and consequently the pressure applied to the bottoms of the individual cylinders 181, 182, 181$^a$, and 182$^a$.

In order that air pressure may be provided to these cylinders 181, 182, 181$^a$, and 182$^a$ at the proper time interval, and for the proper length of time, the supply of pressure air to lines 206 and 207 is controlled by valves 308 and 308$^a$ of valve box 300. These valves will be tripped in the proper sequence, to supply air from supply lines 307$^a$ and 305$^a$ respectively, to lines 206$^c$ and 207$^c$, to thereby actuate for example, tappets 367 and 368 to permit regulated pressure air to flow to the bottoms of the individual tandem groups of cylinders. For example, regulated pressure air will pass from chamber 362, through outlet 362$^a$ into conduit 207, thence through line 207$^a$ and 207$^b$ to the bottoms of cylinders 181$^a$ and 182$^a$. In like manner the actuation of tappet 368 permits regumolds 30 and the upper surface of the neck ring holders 15$^a$. The slots 247 and ribs 247$^a$ are all of equal dimensions. In this manner the neck rings are cooled in an equalizing manner, by high velocity air, applied throughout their entire circumferential area and during the major portion of the time they are in actual glass contact. The application of cooling air to the neck molds continues through a portion of the transfer of the parison and also prior to the return of the neck mold to and during the pressing operation.

An air metering valve 250 is provided in each of the air conduits 246 in the neck mold arms 155 and 159 to permit regulating of the air flow to the slots 247.

The hollow mold support member 31 (FIG. 2) is adapted to support one or more annular blank molds 30 and in this present instance, two blank molds are shown. Each single piece annular parison mold 30 is provided, at its upper end, with a pair of groves 31$^a$ and 31$^b$ into which are fitted opposed thin semi-circular rings 31$^c$ and 31$^d$. These split rings are retained in their operative postions by means of a series of retaining pins 31$^s$ and 31$^t$. The width of the grooves 31$^a$ and 31$^b$ is greater than that of the rings 31$^c$ and 31$^d$ and the vertical spacing between the grooves is greater than the thickness of the top surface of the mold holder 31. The vertical spacing between the rings 31$^c$ and 31$^d$ and the lower shoulder 30$^a$ of each mold 30 is greater than the height of the mold holder 31. These excess dimensions thus permit the molds 30 to have limited freedom of vertical movement with respect to the holder 31 when or at the time molds 30 are seated upon the neck molds 15.

A perforate sleeve 30$b$, which is completely tubular in form for mounting, is positioned to surround each mold 30 and ribs 30$^n$ and is seated and retained upon shoulder 30$^a$ of the mold by the ring 31$^d$. A series of vertical grooves 30$^c$ are formed in the outer wall surface areas of the molds 30 and these grooves are equally spaced circumferentially of the mold. Thus these grooves provide equally spaced ribs 30$^n$ on the outer mold surfaces. These grooves 30$^c$ extend downwardly from just below the top ring 31$^d$ through the length of molds 30 and open outwardly into the atmosphere below the lower shoulder 30$^a$. The perforate sleeve member 30$^b$ is provided with a plurality of groups or tiers of openings. For example, the lower group "A" is comprised of a series of vertically spaced openings 30$^d$ and these openings are so spaced circumferentially as to impinge in each alternate space 30$^e$ between alternate ribs 30$^n$. In the present illustration the total area of the openings in this tier is greater than that of the other tiers. However, this may not always be true because the shape of the parison will be the controlling factor in respect to the area of these openings and their particular pattern of disposition in the member 30$^b$.

The next group "B" is also comprised of a series of vertically spaced openings 30$^g$ and these are positioned above the first or lower group. These openings are spaced circumferentially around mold 30 in groups of two vertical rows with a rib 30$^n$ therebetween and in such manner as to impinge in the grooves or depressions 30$^c$ between ribs. In other words, there will be a vertical row of openings, a rib, a row of openings, three ribs and a row of openings and continuing thus through the circumference. The top row "C" of openings is also comprised of a row of vertically spaced openings 30$^h$ and these are spaced circumferentially around mold 30 with each vertical row being midway between the two vertical rows in the group "B" immediately below.

From the preceding it will be noted that the volume of coolant permitted to pass through each group of openings is reduced in some controlled proportion both vertically and circumferentially to thereby provide a zonal type of cooling. These cooling zones extend through the circumference of the mold and are arranged vertically of the molds 30. The total area of the openings in each group or tier of openings varies from that of the adjacent group as may be demanded by the particular shape of the parison being produced. It is also a function of the perforate member 30$^b$ to create a back pressure in the incoming air supply sufficient to equalize the pressure all around the blank mold and with the holes or spaced openings directing the air to the desired locations.

The cooling air for the molds 30 is brought from a source of supply (not shown) through conduits 40, 41, 35, into passage 31$^r$ of mold holder 31, thence through the several groups of openings A, B, and C in the perforate members 30$^b$ into the grooves or depressions 30$^c$ between ribs 30$^n$, flowing downwardly along said grooves and ribs and exhausting at the openings 30$^j$ beneath the mold holders 31.

In this manner the molds 30 are cooled in vertically juxtaposed adjacent zones each of which may be exactly controlled as to any desired temperature and pattern. Also, the perforate pattern which is individual to a particular shape or design of a mold cavity, may be changed or varied by merely providing a different member 30$^b$ which in turn may be provided with any desired pattern of openings A, B, and C. These members are interchangeable both for different cooling patterns and for each different type of mold 30.

To permit ease of changing these perforate members 30$^b$, as well as changing the molds 30, the mold holder 31 is made in two sections 31 and 31$^e$. The split line of these sections meets as at 31$^f$ and 31$^g$ for exact registration and has spaced apart registered openings 31$^h$ and 31$^j$ in which the annular molds 30 are supported. The molds 30 are locked in the openings 31$^h$ and 31$^j$ by clamping the members 31 and 31$^e$ together by means of a clamp rod 31$^k$ and nut 31$^l$. With this apparatus the molds 30 and perforate members 30$^b$ may be quickly and easily interchanged to suit the production of any desired shape and size of parison.

*Final Blowing Mechanism*

When the neck rings 15 are actuated, as heretofore described, to transfer the formed parisons to the finish blowing station, the parisons are deposited in the open blow mold 12 in a neck-up position. The blow mold 12 in the present instance, is at a fixed station and comprises two cooperating sections 255 which are detachably secured to mold holders 256. The mold holders are hinged upon a pin 257 which is carried by housing 258 having trunnions 259 provided at each end thereof, and which are secured to the side frame elements 260.

The blow mold halves 255 open and close at proper times by means of fluid pressure which is admitted to a vertically disposed cylinder 261 through pipes 262 and 263. These pipes lead respectively from valves 266 and 267 by means of which the flow of pressure delivered to the cylinder 261 may be regulated as desired. The cylinder is mounted on the base 20 of the machine and is provided with a piston 268 which is carried by a piston rod 269. The piston rod 269 extends entirely through and is slidably mounted in both of the heads of the cylinder 261 and is provided at its upper end with a rack bar 272. This rack bar is slidably mounted in the housing 273 and meshes with a spur gear 275 which is fixed to a horizontal shaft 276. The shaft 276 is journaled in the housing 258 and is provided with spiral gears 278 at each end thereof, which mesh with spiral gears 280 fixed to vertical shafts 282. The shafts 282 extend entirely through the housing 258 and are provided at each end with a crank 285. The cranks 285 are connected to the blow mold holders 256 by means of links 286 and together form a toggle to lock the mold sections in a closed position during the blowing operation. The connections between the links 286 and the blow mold holders 256 comprise pins 287 which extend through eccentric bushings 289. These bushings are mounted for rotary adjustment in the blow mold holders 256 in order to secure an accurate contact between the lated high pressure air to flow from chamber 363 to line 206, thence to lines 206ᵃ and 206ᵇ to the bottoms of cylinders 181 and 182. This provides the pressure required to force plungers 192 into the gob of glass and to press a parison at the forming station. The lowering of the plungers is under the control of a single valve 302 which permits a flow of air, at normal pressure, approximately 45 p.s.i., through lines 208 and 208ᵃ from valve box 300.

General Operation

In the operation of the apparatus described above, mold charges of molten glass are delivered by a feeder through the funnel 252ᵃ and are received in succession by the trough sections 252 and delivered into the blank molds 30. The machine then proceeds through the control provided by cam drum 311 to fabricate the mold charges which it receives, first by applying a pressing action to the glass in the combined neck and blank molds 15 and 30, then stripping the blank mold, and swinging the bare parison by the neck rings 15 to an upright position at the finish blowing station during which time the parisons are permitted to reheat, then closing the blow mold 12 and finish blowing the ware, and finally opening the blow mold 12 to release the ware.

As pointed out above, each of these operations may be made as long or as short as desired, provided that all of the successive steps are performed in time to enable the blank mold to receive its next charge of glass in its proper turn. The several operating steps are given an allotted portion of the cycle of operations by suitably changing the position of the pins 309 and 315, upon the valve actuating drum 311.

The cycles of operation may be so arranged that the blow molds are active almost continuously. That is to say, the ware may be taken out of each blow mold immediately before fresh parisons are delivered thereto by the neck rings. The parison mold may be kept in operation almost continuously because the cooling of the neck rings 15 and parison molds 30 is a continuous operation, and as soon as the parisons are transferred to the blow mold 12 and the neck rings 15 returned to the blank forming station, the blank molds 30 are then in a temperature condition to immediately receive another charge for the pressing of succeeding parisons for subsequent transfer to the blow mold 12 during the time that the parisons previously formed in the same blank molds are being blown to final form in the associated blow mold 12. When the parisons are formed, that is to say, when the pressing operation is concluded, the blank mold is stripped from the parisons, leaving the bare parisons supported in inverted position by the neck rings 15.

The stripping movements of the parison molds 30 are concurrent with the transfer movements of the neck molds 15. For example, as the mold holder 31 and molds 30 move directly, vertically, upward away from the inverted shaped parisons, they move in a straight vertical line for a certain distance and then swing horizontally while continuing the vertical movement. At the instant of completion of the horizontal swing of the blank molds 30 or just slightly before, the neck molds 15 start to swing upwardly and around the fulcrum shaft 220 to the blow mold position. At this point the blow mold 12 closes about the parisons, the neck rings 15 open and swing back to the press position and the parison molds 30 swing down upon and in register with the neck rings 15. During the preceding operations both the neck molds and the parison molds are being cooled.

This practically continuous operation of the blank and blow molds renders it possible to press the parisons in the blank molds during the time that the parisons previously pressed in the same blank molds are being blown to final form in the associated blow mold and because these molds 15 and 30 are designed for high speed cooling and are efficiently and continuously cooled in a vertically spaced type of zonal cooling they may be successively and rapidly used for forming parisons at extremely high speeds.

This increased speed of production, made possible by correctly proportioning the walls of the molds to the mass of the glass and properly proportioning the application or impingement of cooling air to the proportioned ribs thereof, enables a very high increase in the bottles per mold per minute to be obtained by these molds.

The savings in weight of metals required over that of ordinary molds will also be considerable and the ease of making these molds and interchanging same will be enhanced.

From the foregoing it will be apparent that a relatively simple molding system has been devised and utilized.

Modifications may be resorted to within the spirit and scope of the appended claims.

We claim:

1. Apparatus for forming hollow glass parisons from supplied charges of molten glass comprising in combination an inverted solid form of parison mold open at upper and lower ends and mounted in a mold holder, the outer surface area of the walls of said parison mold having equally spaced vertical ribs formed thereon, said mold holder and solid mold arranged for movement as a unit to and from a parison forming position, a split neck mold beneath and in aligned molding contact with the lower end of said solid mold at said position, a baffle at said position to close the upper opening of said solid mold, the outer walls of said neck mold provided with a series of vertically disposed slots emanating from a horizontal groove formed in the outer surface of said mold, a neck mold holder encompassing said neck mold and said groove and the major portion of the length of said slots, said neck mold holder arranged to transmit high pressure cooling air to said groove and slots, a vertically movable hollow press plunger arranged to cooperate with said molds and baffle at said parison forming position, a first perforate member arranged to continuously apply a patterned cooling internally of said plunger, means to move said plunger alternately into and out of cooperation with said molds, separate means to move said solid parison mold and said neck mold holders in succession to and from said parison forming position, a second perforate member disposed in said solid mold holder, said second member mounted upon said ribs and surrounding said solid mold, the perforations in said second member being disposed in vertical rows lying between said mold ribs, said rows of perforations being formed in a plurality of tiers staggered horizontally with relation to each other, the total combined area of the perforations in each said tier differing from that of the next vertically adjacent tier, means to supply cooling air through the perforations in said second member to continuously apply high pressure zonal cooling between the ribs of said parison mold, and separate means directing a second supply of high pressure cooling air to said neck mold groove and slots during the parison forming operation only.

2. In a glass forming device the combination of a sectional support for a parison forming mold, said support being hollow and having spaced openings in each section thereof, said openings being arranged in cooperative horizontal and vertical alignment with respect to each other, a single-piece parison mold disposed in said openings, means on said support and engaging said mold for supporting the latter so that it is permitted limited horizontal and vertical float with respect to said openings, the axis of the cavity of said single-piece mold being disposed in the vertical plane, means to clamp said hollow support sections together encompassing said mold to define an annular cooling chamber thereabout when supported in said openings of the mold support, vertical ribs formed on and disposed throughout the major vertical portion of the outer peripheral areas of said mold, a sleeve member within said chamber and mounted on and encompassing said mold and ribs, perforations in said sleeve arranged to envelope said mold in vertically disposed cooling zones of predetermined volume, means to continuously supply a coolant to and through said mold support and the cooling chamber therein, and through said perforations and between said ribs, and means to bodily move said support and said mold to and from a parison forming posistion.

3. In a cooling and transporting device for a glass forming mold, the combination of a hollow support for a parison forming mold, spaced openings in said support disposed in cooperative vertical alignment with respect to each other, a single-piece parison mold disposed in said openings and connected to said support by means providing for both horizontal and vertical float therein, a shaped cavity in said mold, the axis of which is disposed in the vertical plane, vertically disposed air conveying grooves formed in and disposed throughout the major portion of the outer peripheral areas of said mold, a perforate sleeve member disposed on and surrounding said mold and grooves, the perforations in said sleeve establishing the volumetric application of coolant upon said mold in cooperative vertically disposed zones, the perforate pattern in said member being preselected for an individual mold cavity shape, means to continuously supply a coolant to and through said mold support, said perforations and into said grooves, and means to move said support and mold as a unit to and from a parison forming position.

4. Apparatus for forming hollow glass parisons from supplied charges of molten glass to be pressed to parison form, comprising in combination an inverted solid form of parison mold, the cavity of said mold being vertically disposed and open at both ends, said mold mounted in a hollow mold holder, said parison mold having equally spaced vertical ribs formed on its outer walls, a split neck mold beneath and arranged for aligned contact with the lower opening of said solid mold at a parison forming position, means to move said parison mold and said neck mold simultaneously in the same vertical path and alternately to and from said parison forming position, a perforate member within said hollow mold holder and encompassing said parison mold and ribs, means to continuously supply cooling air to the said hollow mold holder and through said perforate member, said perforations of the latter being arranged to apply the cooling air between said ribs in a defined zonal cooling pattern.

5. Apparatus for forming hollow glass parisons from supplied charges of molten glass to be pressed to parison form, comprising in combination a hollow mold holder, an inverted solid form of parison mold open at both ends and supported by said mold holder, the axis of the cavity of said mold being vertically disposed, said parison mold having equally spaced vertical ribs formed on its outer walls, said mold holder and solid mold arranged for movement as a unit in a vertical and horizontal plane to and from a parison forming position, a split neck mold beneath and arranged for aligned contact with the lower opening of said mold at said forming position, said neck mold being arranged for movement in a vertical plane, means to move said solid parison mold and said neck mold successively and alternately in portions of the same vertical plane to and from said parison forming position, an interchangeable perforate member mounted within said hollow mold holder and surrounding said ribs, the perforations in said member being located between said mold ribs and in vertically arranged cooling zones each of which provides a predetermined perforate area, means to continuously supply cooling air through said perforate member to continuously apply zonal cooling to said parison mold, and separate means to apply high pressure cooling air to said neck molds during the parison forming operation.

6. Apparatus for forming hollow glass parisons from supplied charges of molten glass, comprising an inverted solid form of parison mold, the cavity of said mold being vertically disposed and open at both ends, said mold mounted in a hollow mold holder, said mold holder and solid mold arranged for movement as a unit to and from a parison forming position, means to bodily move said mold holder and said solid parison mold to and from said parison forming position, a perforate cooling member in said hollow mold holder and encompassing said parison mold, said member being constructed and arranged to continuously apply cooling air in a zonal cooling pattern to said blank mold, and means to supply coolant to said hollow mold holder and through said perforate member.

7. In a parison forming and transferring device for a glass forming machine, the combination of a hollow mold support, a parison mold disposed in said hollow support, a neck mold, a neck mold support, said parison mold and said neck mold being arranged for bodily movement by their respective said supports to and from a common parison forming position, the axes of the cavities of said parison and neck molds being in alignment and disposed vertically at said forming position, first and second means to respectively move said parison and neck mold supports, a plurality of narrow grooves formed in the outer peripheral area of said parison mold, a plurality of narrow grooves formed in the outer peripheral area of said neck mold and surrounded by said neck mold support, means on said neck mold support to receive and apply a coolant to its said grooves, a perforate sleeve member mounted within said hollow parison mold support and surrounding said parison mold and its said grooves, said sleeve member being constructed to provide for application of a coolant to said parison mold grooves in vertically disposed volumetrically differing zones, and means on said parison mold support to supply coolant to said perforate sleeve member.

References Cited in the file of this patent
UNITED STATES PATENTS

| | | |
|---|---|---|
| 1,461,271 | Hall | July 10, 1923 |
| 1,632,992 | Bragg | June 21, 1927 |
| 1,875,796 | Allen | Sept. 6, 1932 |
| 2,075,363 | Smith | Mar. 30, 1937 |
| 2,118,793 | Howard | May 24, 1938 |
| 2,307,563 | Bridges | Jan. 5, 1943 |
| 2,309,378 | Berthold | Jan. 26, 1943 |
| 2,362,427 | Allen | Nov. 7, 1944 |
| 2,379,830 | Sammuelson et al. | July 3, 1945 |
| 2,402,475 | Waterbury et al. | June 18, 1946 |
| 2,702,444 | Rowe | Feb. 22, 1955 |